(12) United States Patent
Beimdieck et al.

(10) Patent No.: US 10,340,623 B2
(45) Date of Patent: Jul. 2, 2019

(54) CAR CHARGING PLUG-IN CONNECTOR

(71) Applicant: HARTING Automotive GmbH, Espelkamp (DE)

(72) Inventors: Carsten Beimdieck, Bramsche (DE); Alexander Bruland, Rahden (DE)

(73) Assignee: HARTING Automotive GmbH, Espelkamp (DE)

( * ) Notice: Subject to any disclaimer, the term of this patent is extended or adjusted under 35 U.S.C. 154(b) by 0 days.

(21) Appl. No.: 15/923,817

(22) Filed: Mar. 16, 2018

(65) Prior Publication Data

US 2018/0269619 A1    Sep. 20, 2018

(30) Foreign Application Priority Data

Mar. 17, 2017  (DE) .................. 10 2017 105 835
Apr. 18, 2017  (DE) .................. 10 2017 108 174

(51) Int. Cl.
*H01R 13/502*    (2006.01)
*H01R 13/512*    (2006.01)
(Continued)

(52) U.S. Cl.
CPC ............ *H01R 13/512* (2013.01); *B60L 53/16* (2019.02); *H01R 13/42* (2013.01); *H01R 31/06* (2013.01);
(Continued)

(58) Field of Classification Search
CPC .... H01R 13/512; H01R 13/42; B60L 11/1818
(Continued)

(56) References Cited

U.S. PATENT DOCUMENTS 5,676,560 A * 10/1997 Endo ................... B60L 11/1818
                                                                 439/310
7,670,060 B2 *  3/2010 Ziemke ................ G02B 6/3893
                                                                 385/55
(Continued)

FOREIGN PATENT DOCUMENTS

DE     10 2011 106 335 A1    1/2013
DE     10 2013 007 330 A1    10/2014
(Continued)

OTHER PUBLICATIONS

German Office Action, dated Nov. 10, 2017, for German Application No. 10 2017 108 174.7, 6 pages (no English translation provided).
(Continued)

*Primary Examiner* — Abdullah A Riyami
*Assistant Examiner* — Vladimir Imas
(74) *Attorney, Agent, or Firm* — Seed IP Law Group LLP

(57) ABSTRACT

The disclosure relates to a car charging plug-in connector for an electric vehicle, comprising at least one signal contact element and at least two power contact elements. The car charging plug-in connector has a plug-in connector body and a contact carrier. The contact carrier is arranged on the plug-in side of the plug-in connector body and is fastened to the plug-in connector body in a reversible manner. Therefore, the contact carrier can be easily replaced as required, as a result of which the car charging plug-in connector can be used in a particularly cost-effective manner.

11 Claims, 2 Drawing Sheets

(51) Int. Cl.
  *H01R 13/42* (2006.01)
  *H01R 31/06* (2006.01)
  *B60L 53/16* (2019.01)

(52) U.S. Cl.
  CPC ....... *H01R 2201/26* (2013.01); *Y02T 10/7005* (2013.01); *Y02T 10/7072* (2013.01); *Y02T 90/14* (2013.01)

(58) Field of Classification Search
  USPC .................................................. 439/686, 701
  See application file for complete search history.

(56) References Cited

U.S. PATENT DOCUMENTS

| | | | | |
|---|---|---|---|---|
| 8,025,526 | B1* | 9/2011 | Tormey | B60L 3/0069 |
| | | | | 320/109 |
| 8,226,424 | B1 | 7/2012 | Wang et al. | |
| 8,251,742 | B2* | 8/2012 | Takada | B60L 11/1818 |
| | | | | 439/271 |
| 8,591,268 | B2* | 11/2013 | Reimchen | H01R 9/03 |
| | | | | 439/689 |
| 8,814,598 | B2* | 8/2014 | Hein | H01R 13/5812 |
| | | | | 439/455 |
| 8,956,192 | B2* | 2/2015 | Eckel | H01R 13/44 |
| | | | | 439/686 |
| 8,967,466 | B2* | 3/2015 | Reineccius | G06K 19/07758 |
| | | | | 235/381 |
| 8,968,021 | B1* | 3/2015 | Kennedy | H01R 13/6273 |
| | | | | 439/352 |
| 9,085,242 | B2* | 7/2015 | Guillanton | H01R 13/111 |
| 9,520,666 | B2* | 12/2016 | Hagemeier | H01R 12/57 |
| 9,531,103 | B2* | 12/2016 | Fujita | H01R 13/516 |
| 2014/0084678 | A1 | 3/2014 | Isaac | |
| 2015/0251551 | A1 | 9/2015 | Mueller et al. | |
| 2016/0288658 | A1 | 10/2016 | Rudolph et al. | |
| 2017/0279210 | A1 | 9/2017 | Kraemer et al. | |

FOREIGN PATENT DOCUMENTS

| | | |
|---|---|---|
| DE | 10 2015 002 703 B3 | 5/2016 |
| DE | 20 2013 012 354 U1 | 7/2016 |
| DE | 10 2016 105 470 A1 | 9/2017 |
| DE | 10 2016 206 914 A1 | 10/2017 |
| FR | 2 979 490 A1 | 3/2013 |
| JP | 6-290358 A | 10/1994 |
| JP | 2016-509824 A | 3/2016 |

OTHER PUBLICATIONS

Extended European Search Report, dated Apr. 16, 2018, for European Application No. 18000235.4-1205, 8 pages.

* cited by examiner

CAR CHARGING PLUG-IN CONNECTOR

BACKGROUND

Technical Field

The disclosure relates to a car charging plug-in connector for an electric vehicle.

Car charging plug-in connectors of this kind transmit high currents during a charging process of an electric vehicle.

Description of the Related Art

A car charging plug-in connector is known from JP H06-290358 A, in particular in the form of a charging plug for a motor vehicle. With the increasing popularity of electric vehicles, it has become necessary to provide easy-to-handle ways of recharging the batteries of the electric vehicles. To this end, charging stations at which electric cars can be "filled" with current similar to conventional filling stations at which cars are filled with petrol and/or diesel have been developed.

For the purpose of charging the batteries, the electric car is connected to the charging station by a charging cable. The charging cable is generally anchored to the charging station and equipped at the end with a car charging plug-in connector which can be plugged into the charging socket, which is provided for it, of an electric car. Since an electric car is charged very often when used daily, a car charging plug-in connector has to withstand a large number of plug-in cycles. For safety reasons, the extremely expensive car charging plug-in connectors have to be replaced after a certain number of plug-in cycles.

In particular, the car charging plug-in connectors are intended to be easy for anyone to plug in and remove again. This applies, in particular, to small, relatively weak and petite people who likewise have to be able to handle a plug of this kind, together with the electric cable which is fitted to it, in a simple and safe manner.

BRIEF SUMMARY

Embodiments of the present invention provide a car charging plug-in connector for an electric vehicle, which car charging plug-in connector is easy to handle and cost-effective to operate.

The car charging plug-in connector according to embodiments of the invention is provided for the purpose of charging an electric vehicle. The car charging plug-in connector has at least one, but preferably at least two, signal contact elements and at least two power contact elements. The signal contact elements are used to start the charging process and electronically control the said charging process during operation, depending on the battery to be charged and external conditions. A high charging current is frequently transmitted across the power contact elements in order to be able to rapidly carry out the charging process. The car charging plug-in connector has a plug-in connector body and a contact carrier. The contact carrier is arranged on the plug-in side of the plug-in connector body. The contact carrier is fastened to the plug-in connector body in a reversible manner.

The signal contact elements advantageously comprise or consist of a cable connection part and a contact part. Therefore, the signal contact elements are of two-part design. The cable connection part is then preferably designed as a socket on the plug-in side and the contact part is correspondingly in the form of a contact pin on the connection side. The signal contact elements can be plug-connected in a reversible manner and brought into electrically conductive connection by way of this socket/pin connection.

The cable connection parts of the signal contact elements are preferably arranged in the plug-in connector body and also fastened there. The contact parts of the signal contact elements are arranged in the contact carrier and fastened there. The fastening arrangement can be realized, for example, by a latching arrangement.

In an advantageous embodiment, the car charging plug-in connector has a two-part PE contact element comprising a cable connection part and a contact part. The PE contact element is of comparable construction to the signal contact elements and is likewise interconnected by way of the socket/pin principle. The cable connection part is arranged in the plug-in connector body and fastened there and the contact part is arranged in the contact carrier and fastened there.

A conductor of the charging cable is connected to the connection part of the signal contacts or of the PE contact, preferably with the aid of crimping technology. An electrical contact is produced on the contact part so as to form a mating contact element of the charging socket.

In a particularly preferred embodiment of the invention, the power contact elements are fastened in the plug-in connector body and at least a portion of the power contact elements protrudes into the contact carrier in the axial direction. The power contact elements are anchored or fastened in the plug-in connector body, but not in the contact carrier. According to embodiments of the invention, the power contacts are of two-part construction, wherein the contact carrier can be replaced in the event of wear.

The contact carrier is fastened to the plug-in connector body in a reversible manner. The two-part signal contact elements and the two-part PE contact element are separated when the contact carrier is removed from the plug-in connector body. The respective connection parts remain in the plug-in connector body and the respective contact parts remain in the contact carrier. However, the power contact elements are only anchored in the plug-in connector body and—when the contact carrier is removed—protrude out of the plug-in side of the plug-in connector body. Purely theoretically, the car charging plug-in connector could also be plugged into a charging socket of an electric car even without the contact carrier. However, since the contact parts of the signal contact elements are missing in the contact carrier, no charging current is transmitted by the charging station and, respectively, the charging process is not started.

The contact carrier together with the contact parts of the signal contact elements and of the PE contact element can also be replaced in a preventative manner after wear or after a corresponding number of plug-in cycles. However, it is also possible in a simple manner for only the contacts in the contact carrier to be replaced. However, the plug-in connector body together with the connected charging cable can be reused.

The power contact elements advantageously consist of a cable connection part and a contact part. The cable connection part is connected to the contact part in a reversible manner by, for example, a screw connection. A connection of this kind is particularly mechanically stable and has advantages in respect of the current carrying capacity of the power contact elements. If the contact carrier is removed, the contact parts of the power contact elements can be replaced without renewed connection to the corresponding cores of the charging cable being required. Therefore, the proposed car charging plug-in connector is particularly easy to service.

The contact carrier is advantageously fastened to the plug-in connector body in a reversible manner by, for example, a screw connection. Therefore, the contact carrier can be replaced in a simple and rapid manner. Owing to the ability to replace the contact carrier, the car charging plug-in connector can be operated at a very reasonable cost since the majority of expensive components which are accommodated in the plug-in connector body can be reused.

BRIEF DESCRIPTION OF THE SEVERAL VIEWS OF THE DRAWINGS

An exemplary embodiment of the invention is illustrated in the drawings and will be explained in greater detail below. In the drawing.

The figures contain partially simplified, schematic illustrations. In some instances, identical reference symbols are used for elements which are similar but may not be identical. Different views of the same elements may be drawn to different scales.

DETAILED DESCRIPTION

Figure 1:
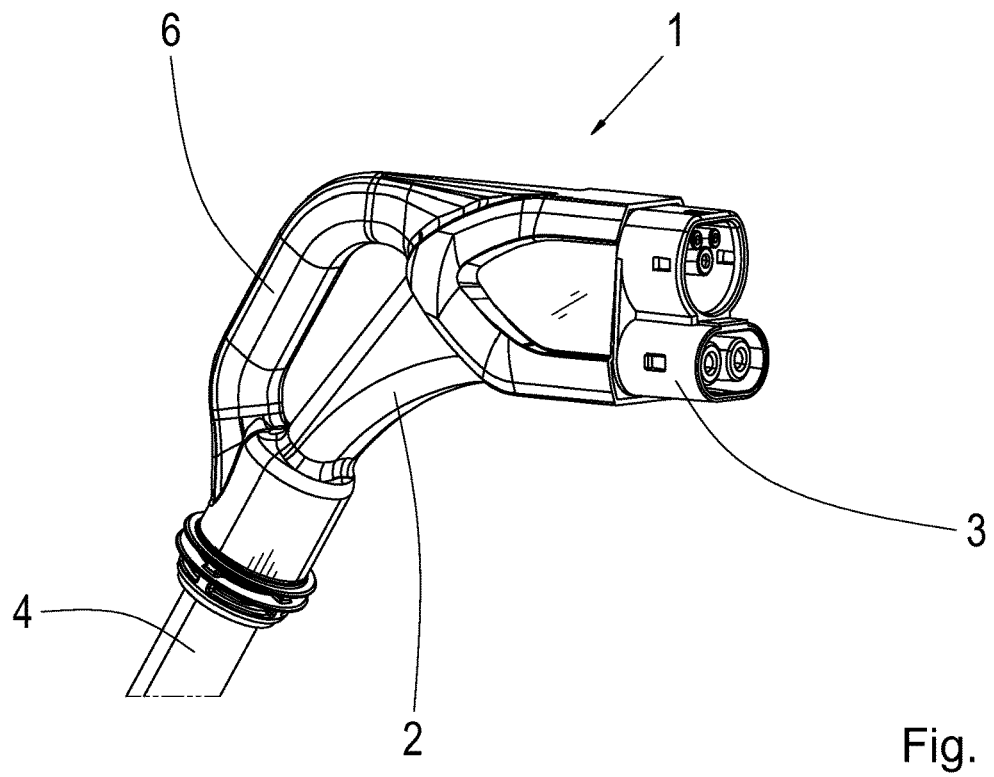
FIG. 1 shows a perspective illustration of a car charging plug-in connector according to an embodiment of the invention.
Figure 2:
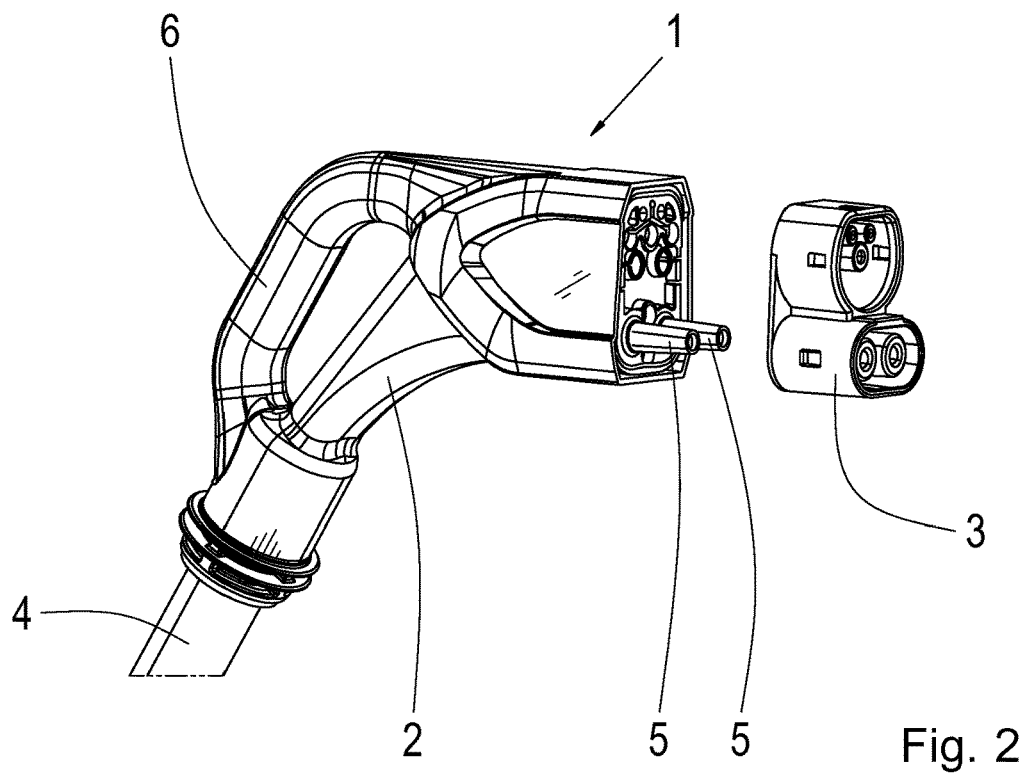
FIG. 2 shows a perspective illustration of the car charging plug-in connector of FIG. 1 with the contact carrier removed.

FIG. 1 shows a perspective illustration of a car charging plug-in connector 1 according to an example embodiment of the invention. The car charging plug-in connector 1 substantially comprises a plug-in connector body 2 and a contact carrier 3 which is screwed to the plug-in side of the said plug-in connector body 2. A charging cable 4 is connected to the car charging plug-in connector 1. Individual conductors (not shown) with which electrical contact is made by the corresponding contact elements of the car charging plug-in connector 1 are located in the charging cable 4. The charging cable 4 also contains a cooling liquid line (not shown) which is directly connected to the power contact elements 5. Therefore, particularly high currents can be transmitted and a rapid charging process can be realized. The power contact elements 5 are configured as socket contacts on the plug-in side. A handle 6 is integrally formed on the plug-in connector body 2. No conductors which transmit the charging current run in the handle region, and therefore the handle region cannot overheat. Therefore, the comfort of the operator of the car charging plug-in connector 1 is increased.

Figure 3:
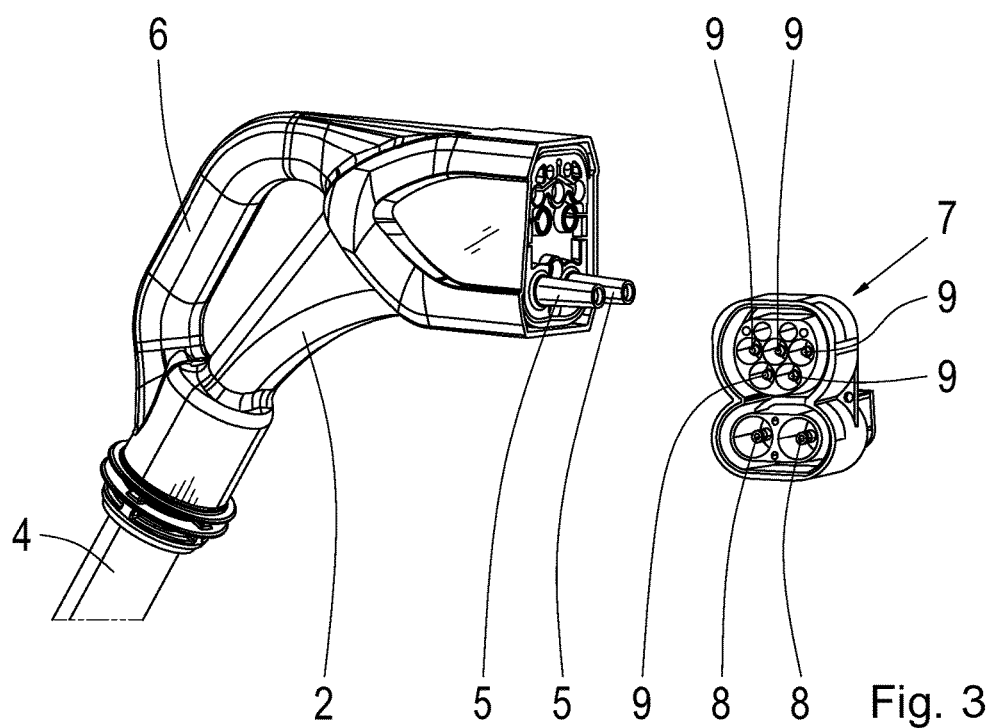
FIG. 3 shows a perspective illustration of the car charging plug-in connector of FIG. 1 without the contact carrier and together with a charging socket.

FIG. 3 shows a charging socket 7 which can be found, for example, on an electric car (not shown). The charging socket 7 has a cross section in the shape of an eight (8). Two contact elements 8 for transmitting the charging current are arranged in the lower region. The contact elements 8 are configured as contact pins on the contact side. Further contact elements 9 which function as PE contact or as signal contact elements for the charging process are arranged in the upper region of the charging socket 7. Theoretically, the plug-in connector body 2 could be inserted into the charging socket 7 without the contact carrier 3 fitted to the said plug-in connector body, as is illustrated in FIG. 3. The power contact elements 5 would also make contact with the associated contact elements 8 of the charging socket 7 in this case, but no current would flow since the signal contact elements of the plug-in connector body 2 are not in electrical contact with the corresponding contact elements 9 of the charging socket 7.

Figure 4:
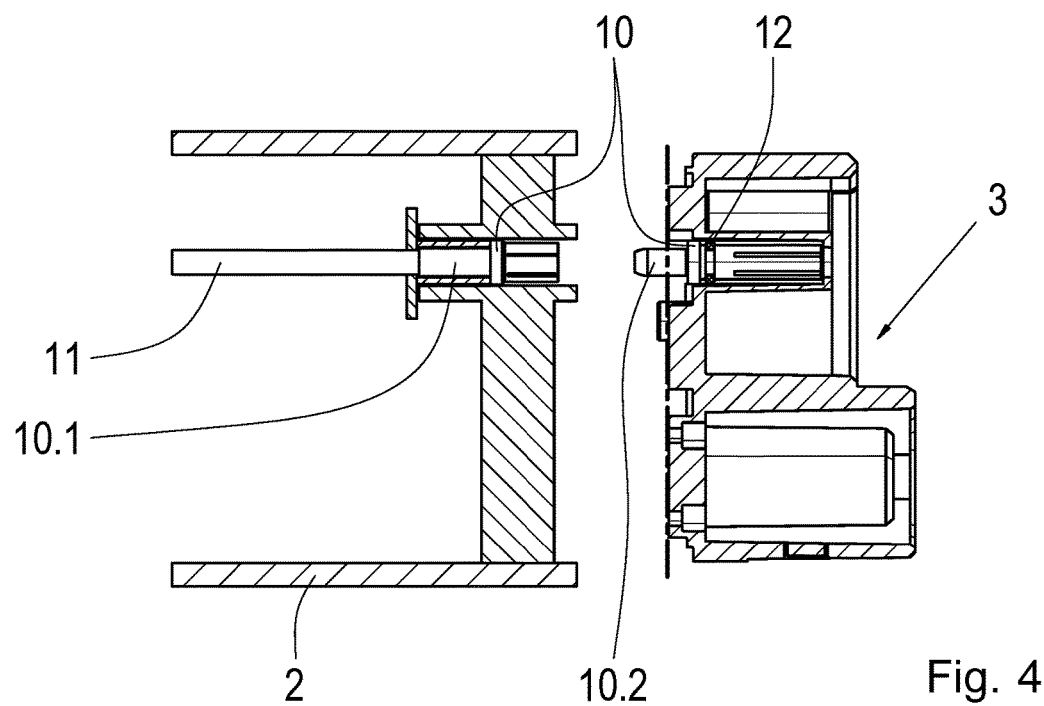
FIG. 4 shows a schematic illustration of the contact region of the plug-in connector body and of the contact carrier.

FIG. 4 illustrates the two-part design of the signal contact elements and of the PE contact element using the example of the PE contact element 10. The signal contact elements may be of identical design to the PE contact element 10. The power contact elements 5 are not illustrated in FIG. 4 for reasons of clarity. The PE contact element 10 comprises or consists of a cable connection part 10.1 and a contact part 10.2. A PE conductor 11 of the charging cable 4 is connected to the cable connection part 10.1. A crimp connection is selected for this purpose. The cable connection part 10.1 is in the form of a socket on the plug-in side. The contact part is accordingly designed as a contact pin on the connection side and as a socket on the plug-in side. The cable connection part 10.1 is fixed in the plug-in connector body 2. The contact part 10.2 is latched in the contact carrier 3 or, as an alternative, is fastened using a commercially available retainer ring or other fastening device. A seal 12 which is arranged in a groove in the contact part 10.2 protects the car charging plug-in connector 1 against penetrating moisture.

When the plug-in connector body 2 and the contact carrier 3 are joined, the cable connection part 10.1 and the contact part 10.2 of the PE contact element 10 are joined and inserted one into the other and electrically connected to one another. The same is true of the signal contact elements. The power contact elements 5 are anchored in the plug-in connector body 2. The front portion of the power contact elements 5, which front portion is designed as a socket, passes through the contact carrier 3 in the axial direction, but is not latched or fastened in any other way here.

Thus, in accordance with embodiments of the invention disclosed herein, a car charging plug-in connector for an electric vehicle is provided which is easy to handle and cost-effective to operate.

Various features and aspects of the embodiments described above may be combined to provide further embodiments. In addition, all of the foreign patent applications listed in the Application Data Sheet, namely, German patent application DE 10 2017 105 835.4, filed Mar. 17, 2017, and German patent application DE 10 2017 108 174.7, filed Apr. 18, 2017, are incorporated herein by reference in their entirety. Aspects of the embodiments can be modified, if necessary, to employ concepts of the applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A car charging plug-in connector for an electric vehicle, comprising:
    a plug-in connector body;
    a contact carrier;
    at least one signal contact element; and
    at least two power contact elements, wherein the contact carrier is arranged on a plug-in side of the plug-in connector body and fastened to the plug-in connector body in a reversible manner, wherein the at least two power contact elements are fastened in the plug-in connector body, extend outwardly from the plug-in side of the plug-in connector body, and are configured to remain fastened to the plug-in connector body when the contact carrier is removed from the plug-in connector body, wherein the contact carrier includes at least two power contact element passages, each power contact element passage being configured to insertably receive a respective one of the at least two power contact elements when the contact carrier is fastened to the plug-in connector body, and wherein, when the contact carrier is fastened to the plug-in connector body, the at least two power contact elements pass through the power contact element passages of the contact carrier without being fastened to the contact carrier, and are arranged to mate directly with corresponding power contact elements of a charging socket.

2. The car charging plug-in connector according to claim 1, wherein the car charging plug-in connector has at least two signal contact elements.

3. The car charging plug-in connector according to claim 1, wherein the at least one signal contact element comprises a cable connection part and a contact part and is therefore of two-part design.

4. The car charging plug-in connector according to claim 3, wherein the cable connection part is designed as a socket on the plug-in side and the contact part is in the form of a contact pin on the connection side.

5. The car charging plug-in connector according to claim 3, wherein the cable connection part of the at least one signal contact element is arranged and fastened in the plug-in connector body and the contact part of the signal contact element is arranged and fastened in the contact carrier.

6. The car charging plug-in connector according to claim 1, wherein the car charging plug-in connector has a two-part PE contact element comprising a cable connection part and a contact part, and wherein the cable connection part is arranged and fastened in the plug-in connector body and the contact part is arranged and fastened in the contact carrier.

7. The car charging plug-in connector according to claim 1, wherein at least a portion of each of the power contact elements protrudes axially into the contact carrier to mate directly with the corresponding power contact elements of the charging socket.

8. The car charging plug-in connector according to claim 1, wherein the power contact elements comprise a cable connection part and a contact part and the cable connection part is connected to the contact part in a reversible manner by a screw connection.

9. The car charging plug-in connector according to claim 1, wherein the contact carrier is fastened to the plug-in connector body in a reversible manner by a screw connection.

10. The car charging plug-in connector according to claim 1, wherein a handle is integrally formed on the plug-in connector body.

11. A car charging plug-in connector for an electric vehicle, comprising:
    a plug-in connector body having a plug-in side provided with a first portion of at least one signal contact element and at least two power contact elements; and
    a contact carrier removably attachable to the plug-in side of the plug-in connector body, the contact carrier including a second portion of the at least one signal contact element which interfaces with the first portion when the contact carrier is attached to the plug-in connector body,
    wherein the at least two power contact elements are fastened in the plug-in connector body, extend outwardly from the plug-in side of the plug-in connector body, and are configured to remain fastened to the plug-in connector body when the contact carrier is removed from the plug-in connector body,
    wherein the contact carrier includes at least two power contact element passages, each power contact element passage being configured to insertably receive a respective one of the at least two power contact elements when the contact carrier is fastened to the plug-in connector body, and
    wherein, when the contact carrier is fastened to the plug-in connector body, the at least two power contact elements pass through the power contact element passages of the contact carrier without being fastened to the contact carrier, and are arranged to mate directly with corresponding power contact elements of a charging socket.

* * * * *